(12) United States Patent
Chiu et al.

(10) Patent No.: US 7,854,865 B2
(45) Date of Patent: Dec. 21, 2010

(54) METHOD OF INJECTION MOLDING THIN THERMOPLASTIC LENSES

(75) Inventors: Hao Wen Chiu, Palm Harbor, FL (US); Roger A. Mayr, Seminole, FL (US); Hsinjin E. Yang, Palm Harbor, FL (US)

(73) Assignee: Essilor International (FR)

( * ) Notice: Subject to any disclaimer, the term of this patent is extended or adjusted under 35 U.S.C. 154(b) by 1073 days.

(21) Appl. No.: 11/147,614

(22) Filed: Jun. 8, 2005

(65) Prior Publication Data

US 2006/0279010 A1    Dec. 14, 2006

(51) Int. Cl.
*B29D 11/00* (2006.01)
(52) U.S. Cl. .......................... 264/2.2; 264/1.1
(58) Field of Classification Search ............... 264/2.2, 264/1.1, 22; 427/54
See application file for complete search history.

(56) References Cited

U.S. PATENT DOCUMENTS

| | | | |
|---|---|---|---|
| 1,948,636 A | 2/1934 | Tillyer | |
| 2,263,249 A | 11/1941 | Rogers | |
| 2,320,375 A | 6/1943 | Moulton | |
| 2,618,200 A | 11/1952 | Clave et al. | |
| 3,031,926 A | 5/1962 | Hancock | |
| 3,877,798 A | 4/1975 | Tolar et al. | |
| 4,268,134 A | 5/1981 | Gulati et al. | |
| 4,287,018 A | 9/1981 | Gulati et al. | |
| 4,495,015 A | 1/1985 | Petcen | |
| 4,547,049 A | 10/1985 | Cotie | |
| 4,576,623 A | 3/1986 | Mann | |
| 4,577,942 A | 3/1986 | Frieder et al. | |
| 4,645,317 A | 2/1987 | Frieder et al. | |
| 4,679,918 A | 7/1987 | Ace | |
| 4,758,448 A * | 7/1988 | Sandvig et al. ............. 351/166 |
| 4,781,452 A | 11/1988 | Ace | |
| 4,793,703 A | 12/1988 | Fretz, Jr. | |
| 4,846,913 A | 7/1989 | Frieder et al. | |
| 4,859,261 A | 8/1989 | Ace | |
| 4,867,553 A | 9/1989 | Frieder | |
| 4,883,548 A | 11/1989 | Onoki | |
| 4,923,758 A | 5/1990 | Marks et al. | |

(Continued)

FOREIGN PATENT DOCUMENTS

GB    1577522    10/1980

(Continued)

OTHER PUBLICATIONS

D.J. Brunelle, G. Kailasam, Polycarbonates, GE Research & Development Center, Technical Information Series, Feb. 2002, pp. 1-32.

*Primary Examiner*—Christina Johnson
*Assistant Examiner*—Larry Thrower
(74) *Attorney, Agent, or Firm*—Keusey & Associates, P.C.

(57) ABSTRACT

Methods are disclosed to injection mold resins, like polycarbonate, to form solid optical lenses. The lenses are ideally suited for use as very thin coating carriers. The method involves closing the mold with a clamp force less than the force exerted on the insert during injection. During injection the mold is allowed to breathe thereby overcoming many of the obstacles associated with injection molding very thin lenses. As the injection pressure subsides, the mold begins to close to perform a coining operation, resulting in a strong, high yield carrier or lens.

22 Claims, 1 Drawing Sheet

U.S. PATENT DOCUMENTS

| | | | |
|---|---|---|---|
| 5,064,712 A | 11/1991 | Fretz, Jr. |
| 5,135,298 A | 8/1992 | Feltman |
| 5,139,857 A | 8/1992 | Herndon et al. |
| 5,147,585 A | 9/1992 | Blum |
| 5,149,181 A | 9/1992 | Bedford |
| 5,178,800 A | 1/1993 | Blum |
| 5,187,505 A | 2/1993 | Spector |
| 5,212,280 A | 5/1993 | Serini et al. |
| 5,223,862 A | 6/1993 | Dasher et al. |
| 5,312,689 A | 5/1994 | Dasher et al. |
| 5,323,191 A | 6/1994 | Firtion et al. |
| 5,351,100 A | 9/1994 | Schwenzfeier et al. |
| 5,415,817 A | 5/1995 | Shiao et al. |
| 5,526,068 A | 6/1996 | Markovitz |
| 5,757,459 A | 5/1998 | Bhalakia et al. |
| 5,790,227 A | 8/1998 | Rorabaugh |
| 5,827,614 A | 10/1998 | Bhalakia et al. |
| 5,851,328 A | 12/1998 | Kohan |
| 5,856,860 A | 1/1999 | Bhalakia et al. |
| 5,858,163 A | 1/1999 | Wood et al. |
| 5,883,169 A | 3/1999 | Spector et al. |
| 5,916,398 A | 6/1999 | Coleman et al. |
| 5,926,248 A | 7/1999 | Tucker |
| 5,959,761 A | 9/1999 | Perrott et al. |
| 5,972,252 A | 10/1999 | Saito et al. |
| 6,033,518 A | 3/2000 | Backfisch |
| 6,051,091 A | 4/2000 | Wood et al. |
| 6,065,836 A | 5/2000 | Krishnan et al. |
| 6,074,579 A | 6/2000 | Greshes |
| 6,102,539 A | 8/2000 | Tucker |
| 6,106,665 A | 8/2000 | Wood et al. |
| 6,109,748 A | 8/2000 | Spector et al. |
| 6,177,032 B1 | 1/2001 | Smith et al. |
| 6,180,033 B1 | 1/2001 | Greshes |
| 6,220,703 B1 | 4/2001 | Evans et al. |
| 6,231,183 B1 | 5/2001 | Dillon |
| 6,242,065 B1 | 6/2001 | Blomberg et al. |
| 6,256,152 B1 | 7/2001 | Coldrey et al. |
| 6,270,698 B1 | 8/2001 | Pope |
| 6,284,162 B1 | 9/2001 | Kingsbury et al. |
| 6,319,433 B1 | 11/2001 | Kohan |
| 6,328,446 B1 | 12/2001 | Bhalakia et al. |
| 6,355,124 B1 | 3/2002 | Blomberg et al. |
| 6,361,166 B1 | 3/2002 | Perrott et al. |
| 6,367,930 B1 | 4/2002 | Santelices et al. |
| 6,432,327 B2 | 8/2002 | Beeloo et al. |
| 6,585,373 B2 | 7/2003 | Evans et al. |
| 6,612,697 B1 | 9/2003 | Aurelius et al. |
| 6,616,868 B1 | 9/2003 | Gotoh et al. |
| 6,719,928 B2 | 4/2004 | Dillon |
| 6,793,339 B1 | 9/2004 | Yip et al. |
| 6,797,104 B1 | 9/2004 | Dyer |
| 6,814,896 B2 | 11/2004 | Bhalakia et al. |
| 6,884,369 B2 | 4/2005 | Chiu et al. |
| 6,902,271 B2 | 6/2005 | Perrott et al. |

FOREIGN PATENT DOCUMENTS

| | | |
|---|---|---|
| WO | WO 00/71331 A1 | 11/2000 |
| WO | WO 03/004255 A2 | 1/2003 |
| WO | WO2004/020183 A | 3/2004 |

* cited by examiner

METHOD OF INJECTION MOLDING THIN THERMOPLASTIC LENSES

BACKGROUND OF THE INVENTION

1. Field of the Invention

The present invention relates to a method injection molding ultra thin thermoplastic lenses. The lenses produced according to the invention have particular utility as carriers in the Transfer process as described in the patent application WO 03/004255.

2. Description of the Related Art

Lenses and other articles manufactured at optical quality, have exacting demands for mold replication, high optical transmission and impact resistance. In the 2002 Polycarbonates publication, Brunelle and Kailasam describe how polycarbonate is prepared by the transesterification of a bisphenol-A with a carbonate. U.S. Pat. No. 5,212,280 describes diphenols which are useful in the condensation method of producing polycarbonate in the presence of phosgene.

Injection molding of lenses requires edge gating so that the runner ends up remote from the lens surfaces. The paths from the gate to the edge points of the mold cavity are not symmetrical and therefore make it difficult to control the thermodynamics of the cooling melt flow. As lens cavities become thinner, straight injection molding techniques are unable to fill the mold without premature freeze-off. Accordingly, injection molding machines have been modified to enlarge the cavity during some phase of the injection cycle, in a so-called injection/compression process. An example of injection/compression utilizing auxiliary component hardware follows.

U.S. Pat. No. 5,972,252 uses auxiliary hydraulic cylinders to move the insert on the movable side of the mold. Toward the end of the injection cycle, the hydraulic cylinders advance the retracted insert toward the stationary side of the mold to compress the resin to its final thickness.

U.S. Pat. No. 6,616,868 overfills an enlarged cavity and during a compression step, the excess resin is forced back into the injection cylinder. In an alternate embodiment, the pressure in the injection cylinder and the compression force are adjusted to deliver an amount of resin needed to achieve the target thickness.

U.S. Pat. No. 6,284,162 uses an auxiliary hydraulic cylinder to move one of the insert to create an enlarged cavity. After introduction of the resin, the hydraulic cylinder advances the insert to a hard stop point which corresponds the final part thickness. The reference attempts to overcome a series of problems associated with clamp-end injection/compression molding. Among the problems noted is the inability to mold thin centered lenses under the high clamp pressure and tendency for such systems to create flash and damage the equipment.

U.S. Pat. No. 5,415,817 employs a sleeve which extends past the insert to close the parting line while the insert remain retracted. When the insert begins advancing to compress the resin, excess molding material flows into an overflow well formed in the sleeve.

WO 00/71331 describes one embodiment which does not utilize auxiliary hardware, but employs a first low clamp force during initial filling of the mold. The injection screw then switches over to velocity-pressure mode and the second higher clamp force is exerted after which a coining operation occurs. In a second embodiment, the first clamp force brings an auxiliary third plate of a three plate mold to position corresponding to an enlarged cavity. The second clamp force than advances the third plate to compress the resin to its target thickness.

As can be seen from the above descriptions, auxiliary component injection/compression molding utilizes springs, cylinders or other mechanical means to exert a force on the insert and move it relative to its sleeve or its mold side. These systems typically exert a compressive force less than the clamp force, frequently in applications where it is believed that clamp force is excessive. However, they add cost and complexity to molding systems. Operators have to coordinate the clamp force in addition to the auxiliary component equipment and settings. Accordingly it would be desirable to injection mold high quality thin lenses with the simplicity of a clamp-end process.

SUMMARY OF THE INVENTION

It is an object of the present invention to provide a method for injection molding thin (less than 1 mm thickness) thermoplastic lenses.

It is yet another object of the present invention to mold such lenses without using high-speed injection molding machines.

It is a further object of the present invention to utilize a clamp-end coining process to provide strong, high-yield lenses.

These and other objects according to the invention are obtained by a method for injection molding thin lenses with a coining operation, in which the mold halves are closed with a predetermined clamp force $F_c$ that is less than the net integrated force exerted on the mold inserts during injection. Molding material is injected into the cavity with a force $F_I$ greater than $F_c$ to force the mold open thereby reducing the flow resistance and allowing the material to reach portions of the insert periphery. A lens having a section less than 1 mm thick is coined as the net integrated force on the inserts subsides.

The flow resistance is reduced by venting the cavity through the open parting line of the mold or reducing the flow resistance, or a combination of both. During the injecting step, the molding material is in intimate contact with the inserts at a thickness greater than the final coined lens thickness. The coining step reduces the thickness of the lens to between 0.5 and 0.6 mm thick as the mold closes. Following the injecting step, the method further includes the step of shifting the injector to packing pressure mode so that molding material stops flowing into the cavity. For clamp-end coining, the inserts are secured in a fixed position within their respective sleeves, so that force exerted on the inserts by the molding material is transferred to the mold clamp.

The injecting step includes injecting molding material at a speed of at least about 3 ips and at an injection pressure of at least about 10,000 psi. The coined lens is utilized in a coating transfer process to apply a coating to another lens. The molding material is a thermoplastic having a viscosity of less than 400 Pa for shear rates below 1,000/s at 300 degrees C.

The invention also includes lenses obtained by the above-described methods, wherein the lens is made of a thermoplastic having a viscosity less than 400 Pa for shear rates below 1,000/s at 300 degrees C. and wherein the lens has a thickness between 0.5 mm and 0.6 mm. The lens may be utilized in a front side (FST) or back side (BST) transfer process, i.e. as a plano carrier having a thickness of between 0.5 and 0.6 mm across its entire surface.

Alternatively, the method according to the invention may produce lenses having a negative power with a center thickness less than 1 mm, for example between 0.7 mm and 0.8 mm. Lenses may be produced having a positive power with an edge thickness less than 1 mm.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF PREFERRED EMBODIMENTS

Figure 1:
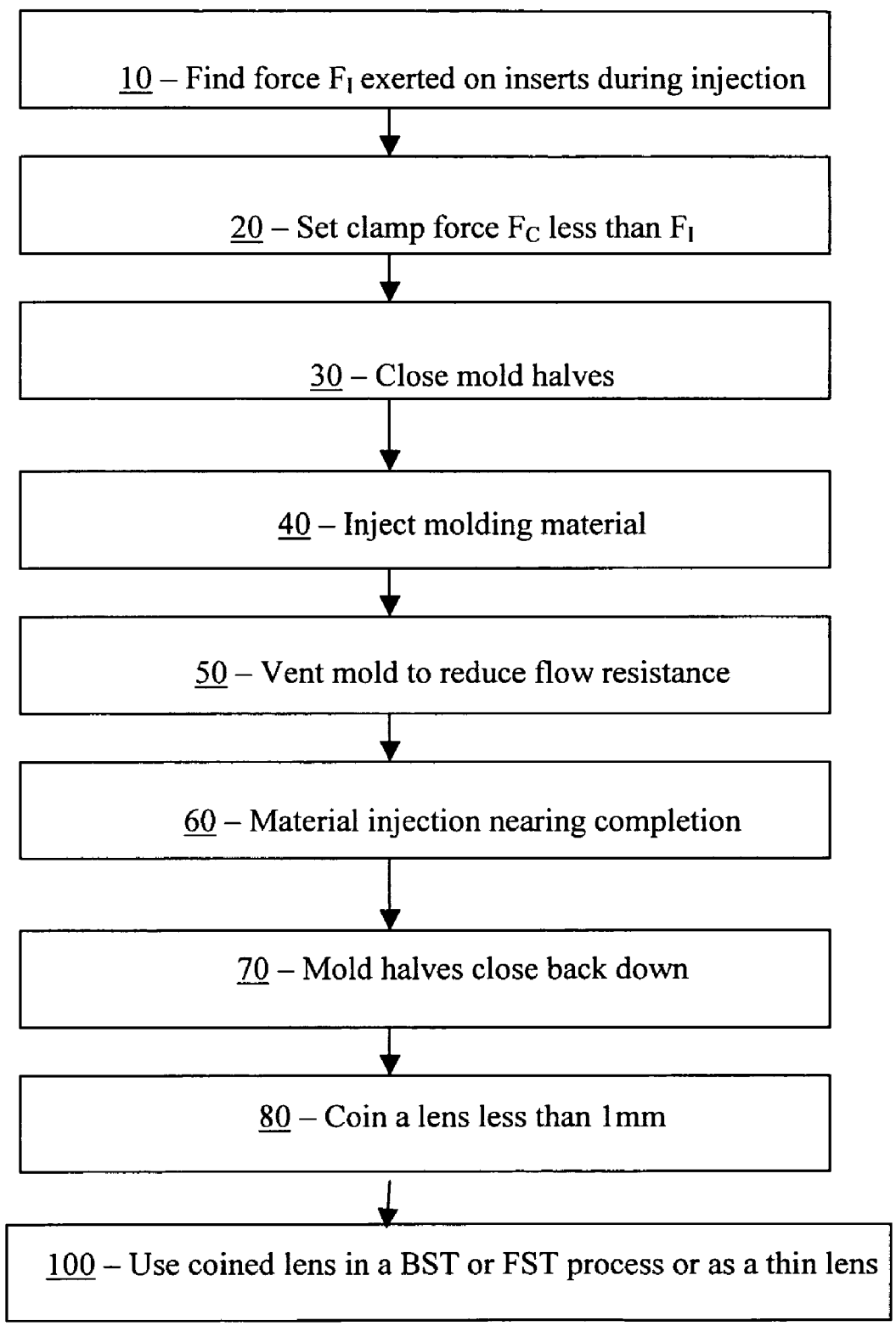
FIG. 1 is a flowchart showing various steps according to an embodiment of the method of injection molding according to the invention.

The present invention provides methods for producing thin lenses made from a thermoplastic material. The invention overcomes difficulties typically associated with injection molding lenses less than 1 mm thick, for example lenses of about 70 mm in diameter. Applications for such lenses include their use as carriers in the backside transfer (BST) process or the front side transfer (FST) process, described in greater detail below. Carriers for the BST or FST processes may be manufactured as surfaced carriers, thermoformed carriers or injection molded carriers. Further applications include the production of powered lenses having center or edge sections upto about 1 mm thick.

As used herein, the term lens means an optical grade article. The term includes plano lenses as well as powered lenses. Thermoplastic means an optically clear thermoplastic of optical grade. Thermoplastics that may be used include, by way of example only, polycarbonates, polycarbonate/copolyester blends, diethylene glycol bis(allylcarbonate), acrylics like PMMA, cyclic olefin copolymers, amorphous polyamides, polyesters, copolyesters, polyurethanes, and the like.

The BST process transfers a coating to the backside of a lens through the use of a carrier. The technical details of the process are present in U.S. Pat. No. 6,562,466 by Jiang et al, the entire contents of which are incorporated herein by reference thereto. In the present application, it is understood that all details related to the back side of a lens may be also applied to the front side of the said lens. For example, see WO 03/004255 which describes such coating transfer processes, the entire contents of which are incorporated herein by reference thereto.

The coating carrier is a thin thermoplastic piano lens. For example, the carrier lens may be made from polycarbonate. The geometric characteristics of a carrier, such as thickness and base curve uniformity, play a critical role in the success of BST/FST because the laminating process relies on the deformation of the carrier to match the back surface of a lens for seamless transferring of the coating. In addition, the surface condition of a carrier predetermines the coating quality of the resulting lens since the carrier is the initial bearer of the reversed HMC (Hard Multi Coating) stack. HMC is a hard coat or anti-reflective layer or both which are applied to lenses.

A carrier lens with a center thickness about 0.5 mm achieves an excellent balance between flexibility for laminating and rigidity for coating. Carriers can be made by surfacing a lens blank, thermoforming polycarbonate sheets or by injection molding. Severe challenges arise in attempting to injection mold a meniscus-shaped article, at optical quality, via edge-gated injection molding. A gate height on the order of 0.5 mm affects the conditions under which material can be delivered across a 70 mm lens diameter, and the resulting 3,000 plus square millimeter surface area. The narrow flow passage in the cavity itself, along with the high viscosity of the polycarbonate melt dramatically increases the flow resistance. In addition, as the molten resin is spread thin through contact with the insert surfaces, its surface area rises in proportion to its volume resulting in excessive heat loss. As a result the melt front tends to freeze off prematurely resulting in short-shots.

The flow resistance of a resin is directly related to its melt viscosity. Below are some Viscosity values (in Pa) for the shear rates (in 1/s) at the top of each column for various PC (Polycarbonate) resins.

TABLE 1

| Viscosity Values (in Pa) for Various Shear Rates | | | | | | |
|---|---|---|---|---|---|---|
| Shear Rate (1/s) | 0.1 | 1 | 10 | 100 | 1000 | $1 \times 10^4$ |
| GE Lexan OQ3820 | 3600 | 3400 | 3000 | 2200 | 750 | 150 |
| GE Lexan HF1110 (high flow) | 350 | 340 | 330 | 300 | 220 | 80 |
| Bayer Makrolon 2407 | 550 | 540 | 500 | 450 | 300 | 80 |
| Bayer Makrolon CD2005 | 180 | 180 | 180 | 170 | 140 | 45 |

The values in Table 1 suggest that increasing the shear rate by raising the injection speed can decrease the melt flow resistance. In addition, sufficiently high injection speed can overcome the unfavorable thermodynamic heat loss in which the melt front freezes off before filling the cavity. In general, the methods according to the invention contemplate the use of optically clear thermoplastics having a viscosity below 400 Pa at a shear rate of 1,000/s measured at 300 degrees C.

Simulation 1

The GE HF 110 (high flow) resin was modeled in a MoldFlow filling simulation of a single 71 mm lens of 0.5 mm thickness with a gate entrance area of 9.8 mm². At an injection pressure of 24,000 psi, the model simulated four filling times of 1, 0.5, 0.25 and 0.1 seconds. This corresponds to volumetric flow rates of 2028, 4056, 8112, and 20,280 mm³/s. The mold was filled using the shortest fill time of 0.1 seconds. The other filling times resulted in short shots.

Simulation 2

The importance of melt flow index was researched using GE OQ3820 resin having a melt flow index (MFI) of 7; GE HF1110 with a MFI of 25; and Bayer CD2005 with a MFI of 63. Under the same processing conditions as above, at a 0.25 second filling time, the cavity was easily filled with the CD2005 while the other resins resulted in short shots.

Example 1

A Cincinnati RoboShot was configured to operate at maximum injection speed of 5.9 inches per second (ips), maximum injection pressure of 24,000 psi and maximum clamp tonnage of 110 U.S. tons. The machine was equipped with a 2-cavity, 71 mm diameter mold from APEX. One cavity was blocked, and the other held a 6-base stock plano steel insert set. Thin carriers were molded with Bayer DP1-1265 and Bayer 2407 under the following process parameters:

| | |
|---|---|
| Mold Temperature: | 280 degrees F. |
| Melt Temperature: | 595 degrees F. |
| Injection Speed: | 5.9 ips - one step |
| Packing: | 12,000 psi - 2 sec; 10,000 psi - 3 sec; 5,000 - 5 sec |

The Bayer DP1-1265 resin produced the thinnest lenses having a center thickness slightly above 0.6 mm. Lenses with a 0.65 mm center thickness were common, thereby failing to achieve the objective of molding lenses about 0.5 mm. Since the carriers were thicker than desired, it followed that the BST yield ranged from 44% to 78%. Other problems included non-uniform thickness, base curve variation, and breakage. Part of the problem was tracked during a volumetric flow simulation which indicated very high pressure near the gate resulting in negative shrinkage (expansion) during cooling. An investigation of carrier breakage revealed two main causes: the use of a low molecular weight resin; and flow orientation.

Low molecular weight resin. The low molecular weight DP1 was chosen for its favorable flow characteristics, although it is inherently more brittle that other higher molecular weight resins such as Bayer 2407, GE HF1110 or GE LFV249. A long molding residence time may cause degradation to the polymer chains, resulting in a further detrimental reduction in molecular weight and contributing to breakage.

Flow Orientation. The foremost reason for breakage was believed to be a flow orientation effect, which reduces the strength of the carrier when a bending force is perpendicular to the direction of flow. This explains why carrier breakage during BST occurs most frequently along the gate-to-tab straight [diameter] line. To demonstrate the flow orientation, a MoldFlow simulation utilizing glass fiber filled PC resin was conducted. The simulation illustrated parallel fiber orientation in the skin layer extending from the gate to the tab in a straight line. While fibers in the core are oriented in a perpendicular direction. Again the large surface area to volume ratio becomes a problem in molding thin carriers. It was theorized that the strength of the part becomes directional dependent, wherein the part is weaker along the flow and stronger across the flow. The contribution of orientation to breakage was confirmed through DMA (Dynamic mechanical analyzer) fatigue testing.

Dynamic Mechanical Analyzer Test. In the test, the storage modulus of a sample was recorded over time under cyclic bending. Several PC bars were cut from a commercial CD disc and lenses molded with GE ophthalmic grade, Bayer high flow 2407 and CD/DVD DP1-1265 resins. For each material, two testing bars were sampled, one with the long edge parallel to the flow and the other with the long edge perpendicular to the flow. All samples had a thickness of 1.2 mm, and were bent along the long edge.

TABLE 2

Seconds to Onset of Failure in DMA

| Sample | cut parallel to flow | cut perpendicular to flow |
|---|---|---|
| GE | did not break | 192 secs. |
| Bayer 2407 | did not break | 127 secs. |
| Bayer CD | 93.2 secs. | 3 secs. |
| comm. CD disc | 46 secs. | 28 secs. |

With the GE and Bayer 2407 samples, no breakage occurred for samples cut parallel to flow during the duration of the 1,000 second test. The samples cut perpendicular did break at the times indicated. The Bayer CD parallel sample failed much earlier than the Bayer 2407. The perpendicular sample broke almost immediately. The CD commercial grade parallel sample behaved similarly to the Bayer CD. However, the perpendicular sample took longer to fail than the Bayer CD. It was concluded that the molding process to produce the samples introduced more of a detrimental orientation effect than commercial CD molding, but probably about the same degree of molecular degradation.

Since Bayer 2407 is less brittle than CD commercial grade, blending of Bayer 2407 and CD grade resins was used to address the carrier breakage issue. Since the blend was a higher viscosity than the CD commercial grade alone, the thinnest part had a center thickness of about 0.65 mm. Test results of these carriers showed no breakage during BST. However, the optical yields were undesirable because the carriers were too thick. In order to reduce thickness to the target 0.5 mm level, it was determined that a machine with an injection speed higher than the RoboShot's 5.9 ips was needed.

Example 2

A further test was conducted with an Engel conventional high speed machine operating at the maximum 200 ton hydraulic clamp force and the maximum injection speed of 40 ips. The 2-cavity, 76 mm diameter mold was used. Both GE OQ1030 (CD grade) and GE HF1110 (high flow) resins were used. The OQ1030 achieved an actual injection speed of 25 ips and carriers having a center thickness of 0.5 mm were obtained. For the HFI110, carriers with center thicknesses slightly under 0.6 were obtained. BST laminating tests of the resulting carriers in applying PHC (protected hard coat) resulted in a 90% yield.

The parts from the Engel machine were characterized by the presence of excess flash. During injection, it was observed that the parting line was forced open allowing the resin to flow out of the boundary of the mold inserts. At the same time, however, resin was easily able to flow across the inserts as the passage was wider and pressure from within the cavity was released. Accordingly, one aspect of the invention may be to inject a greater volume of molding material than is required to form the lenses themselves. For example, 1.5× to 3× the volume of molding material may be injected to facilitate the opening of the mold. Toward the end of the injection phase, as the flow of material into the cavity decreased, the mold began closing down from its fully open position. This coining action that occurred on the portion of the resin still contained within the periphery of the inserts minimized flow orientation, producing a higher strength carrier.

Example 3

A Nissei FN4000 having a 200 ton hydraulic clamp was configured to operate at 75% of maximum clamp force to obtain a better balance with the maximum injection speed of 132 mm/sec [5.2 ips]. Bayer DP1-1265 and GE OQ1030 were utilized in the example with a melt temperature of 595 degrees F and a mold temperature of 265 degrees F. The process was utilized to mold a pair of 76 mm 6-base plano steel insert in a 60 second cycle. Due to excess flash, secondary processing including degating and die-cutting was needed to obtain the final carriers. However, the quality of the resulting carriers is almost on par with regular plano lenses, and is superior to those obtained from surfacing. Lens having a center thickness of about 0.56 mm were produced consistently. In a subsequent test of the carriers with full HMC stack, resulted in an 86% acceptable yield. The carriers resulting from this example are compared to surfaced carriers and thermoformed carriers in the following Table 3.

TABLE 3

| Parameter | Units | Method | Group A Surfaced Carriers | | Group B Thermoformed Carriers | | Group C Injection-Molded Carriers | |
|---|---|---|---|---|---|---|---|---|
| | | | Mean | Std. Dev. | Mean | Std. Dev. | Mean | Std. Dev. |
| Sphere | Diopters | Humphrey | 0.08 | 0.04 | −0.01 | 0.03 | 0.09 | 0.01 |
| Cylinder | Diopters | Humphrey | −0.04 | 0.03 | −0.01 | 0.03 | −0.02 | 0.01 |
| Prism | Diopters | Visionix (ref.) | 0.32 | 0.06 | 0.11 | 0.01 | 0.09 | 0.05 |
| Center thickness | mm | Gage | 0.53 | 0.03 | 0.47 | 0 | 0.56 | 0.0004 |
| Max. Thickness Difference | mm | Gage (prism base to apex) | 0.1 | 0.04 | 0.01 | 0 | 0.08 | 0.03 |
| Radius 1 convex | mm | Radiuscope | 85.27 | 0.81 | 87.26 | 2.55 | 82.6 | 0.34 |
| Radius 2 convex | mm | Radiuscope | 1.37 | 0.65 | 4.37 | 2.07 | 2.95 | 1.65 |

While the high speed Engel machine produced a very high yield, it was discovered that appropriately controlling injection pressure and clamp force, even on a standard machine, can produce adequate yields. Injection pressure affects the mold opening force as a function of the pressure impinging on the inserts. Mathematically, the cavity pressure is integrated across the insert surface to obtain the mold opening force. Now it becomes a matter of balancing the mold opening force with the clamp force. The term "net integrated force" refers the resulting effective force urging the opposing insert away from each other against the biasing force of the mold clamp.

In Example 1, by blocking off one cavity, the surface area was reduced by half, thereby proportionally diminishing the mold opening force. Examples 2 and 3 demonstrate that molding at 40 ips, with an effective speed of 25 ips, can produce generally similar results to molding on a 5.2 ips machine. By lowering the clamp tonnage and allowing the mold to breathe, many of the technical difficulties associated with filling a thin cavity are overcome.

Based on these tests, slightly thicker lenses, having a center thickness between about 0.7 mm and 0.8 mm, have been molded with powers from −2 to +2. The principles derived from these tests lead to the conclusion that the methods according to the invention can be employed to make a full range of powered lenses. For example, minus lenses can be injection molded upto −8 having a center thickness about 1 mm or less. Furthermore, plus lenses upto +8 can be injection molded having an edge thickness of about 1 mm or less.

The basic steps for performing the method according to the invention, shall be more clearly explained with reference to the flowchart of FIG. 1. In step 10, the operator obtains a working value representing the force $F_1$ that will be exerted on the inserts during injection as a mold opening force. This value may be obtained by calculations, simulations or by previous molding trials. In step 20, the operator selects a clamp force $F_c$, which is less than $F_1$, and sets the value on the machine. The temperature settings are adjusted with due consideration for the particular molding material used. In practical tests, polycarbonate of varying flow characteristics were successfully used. Typically the melt temperature will be around 590 degrees F to around 600 degrees F. The mold temperature will be around 250 degrees F to 290 degrees F.

Now the molding cycle begins by closing the mold halves in step 30. Next, inject molding material in step 40. Because of the calculations in step 10 and the setting in step 20, the injection pressure exerted on the inserts will eventually exceed the clamp force. In the case of a straight injection molding machine, the insert is securely fixed within the sleeve which in turn is securely fixed to the respective side of the mold. This feature gives the operator flexibility in setting the distance between inserts equal to, or less than, the final part thickness. Accordingly, the movement of the inserts away from each other directly causes opening or venting of the parting line in step 50. This reduces the flow resistance by enlarging the cavity and reducing the pressure contained within the closed cavity. A range of injection speeds from at least about 3 ips to 5.2 ips on the low end to at least about 25 ips to 40 ips on the higher end have been used in practical runs following certain embodiments of the invention. The maximum injection pressure of 24,000 psi or more has been successfully tried also. While these are exemplary, other values may prove useful as long as the net integrated force $F_1$ of the melt flow is allowed to exceed the clamp force. For example, an injection pressure of at least 10,000 psi.

The material being injected into the cavity may be measured by volume or other parameter and step 60 signifies nearing completion of the injection phase. To insure mold filling under all speed/pressure conditions, the volume of molding material that is injected may be increased upto 1.5× to 3× the volume of the molded parts. As the flow of material into the now open cavity begins to slow, the pressure diminishes. Once the clamp force exceeds the pressure exerted by the molding material, the mold halves return from their open state in step 70. Step 70 may occur while material is still flowing into the cavity, for example, at a slower rate than initially. Step 70 may occur after the preset volume has been injected. In practical embodiments, the machine is shifted into packing pressure mode around step 60. This mode maintains pressure on the material screw to hold pressure in the cavity at a certain level, without introducing substantial amounts of additional material. The mold halves may return to their original position, or they may coin the lens to a thickness of less than 1 mm in step 80 without completely closing. The degree of mold closing may be controlled by, or operate as a function of, the volume add-on mentioned above to arrive at the target thickness. The thin lenses manufactured according to the invention may be adhered to additional lenses to form composite lenses. The lenses are however, well suited for use in a BST or FST process or as a thin powered lens, as indicated in step 100.

Having described preferred embodiments for lens manufacturing, materials used therein and methods for processing same (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for injection molding thin lenses with a coining operation, the method comprising the steps of:
    providing an injection molding machine with two mold halves that are opened and closed by a mold clamp along a parting line, wherein each mold half includes a sleeve securely fixed to the respective mold half and a mold insert secured in a fixed position within the sleeve, wherein the insert, sleeve and respective mold half remain securely fixed in position relative to one another during the entire process;
    closing the mold halves with the mold clamp to a predetermined clamp force $F_c$ that is less than a net integrated force exerted on the mold inserts during injection, whereby the closed inserts define a cavity;
    injecting molding material into the cavity via at least one gate so that the force exerted on the inserts by the molding material is transferred via the securely fixed position of the inserts to the mold halves to force the mold halves open along the parting line of the mold thereby reducing flow resistance and allowing the material to reach portions of the mold insert periphery; and
    coining a lens having a section less than 1 mm thick as the net integrated force on the inserts subsides and the mold halves close back down.

2. The method of claim 1, wherein reducing the flow resistance comprises:
    venting the cavity through an open parting line of the mold.

3. The method of claim 1, wherein reducing the flow resistance comprises:
    increasing a cavity height from the at least one gate to remote portions of the insert periphery.

4. The method of claim 1, wherein reducing the flow resistance comprises:
    venting the cavity in combination with increasing a cavity height.

5. The method of claim 3, wherein during the injecting step, the molding material is in intimate contact with the inserts at a thickness greater than the final coined lens thickness.

6. The method of claim 5, wherein said coining step includes reducing the thickness of the lens as the mold closes.

7. The method of claim 6, wherein the step of coining comprises coining a lens between 0.5 and 0.6 mm thick.

8. The method of claim 1, wherein the step of coining comprises coining a lens between 0.5 and 0.6 mm thick.

9. The method of claim 1, wherein following said injecting step, the method further includes the step of shifting to packing pressure mode so that molding material stops flowing into the cavity.

10. The method of claim 1, wherein said injecting step includes injecting molding material at a speed of at least about 3 ips.

11. The method of claim 1, wherein said injecting step includes injecting molding material at an injection pressure of at least about 10,000 psi.

12. The method of claim 1, wherein the coined lens is utilized in a coating transfer process to apply a coating to another lens.

13. The method of claim 1, wherein the molding material is polycarbonate.

14. The method of claim 13, wherein the polycarbonate has a viscosity of less than 400 Pa for shear rates below 1,000/s.

15. The method of claim 1, wherein the lens is made of thermoplastic having a viscosity less than 400 Pa for shear rates below 1,000/s.

16. The method of claim 15, wherein the lens comprises a plano carrier.

17. The method of claim 16, wherein following the coining step, the method further comprising the step of:
    depositing a coating on the plano carrier and transferring the coating to another lens.

18. The method of claim 17, wherein the plano carrier has a uniform thickness of between 0.5 mm and 0.6 mm across its entire surface.

19. The method of claim 1, wherein the lens has a negative power and a center thickness of less than about 1 mm.

20. The method of claim 15, wherein the lens has a negative power and a center thickness of less than about 1 mm.

21. The method of claim 1, wherein the lens has a positive power and an edge thickness of less than about 1 mm.

22. The method of claim 15, wherein the lens has a positive power and an edge thickness of less than about 1 mm.

* * * * *

UNITED STATES PATENT AND TRADEMARK OFFICE
CERTIFICATE OF CORRECTION

| | | |
|---|---|---|
| PATENT NO. | : 7,854,865 B2 | Page 1 of 1 |
| APPLICATION NO. | : 11/147614 | |
| DATED | : December 21, 2010 | |
| INVENTOR(S) | : Hao Wen Chiu, Roger A. Mayr and Hsinjin E. Yang | |

It is certified that error appears in the above-identified patent and that said Letters Patent is hereby corrected as shown below:

Cover page, item (73), line 1, after "INTERNATIONAL" insert --Compagnie Generale d'Optique--.

Signed and Sealed this
Fifteenth Day of March, 2011

David J. Kappos
*Director of the United States Patent and Trademark Office*